J. T. H. DEMPSTER.
ELECTRICAL HEAT STORAGE DEVICE.
APPLICATION FILED OCT. 7, 1912.
1,062,896.
Patented May 27, 1913.
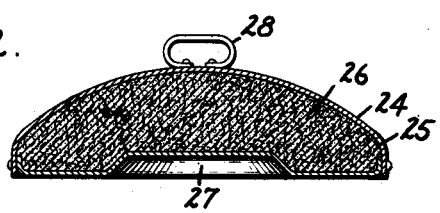
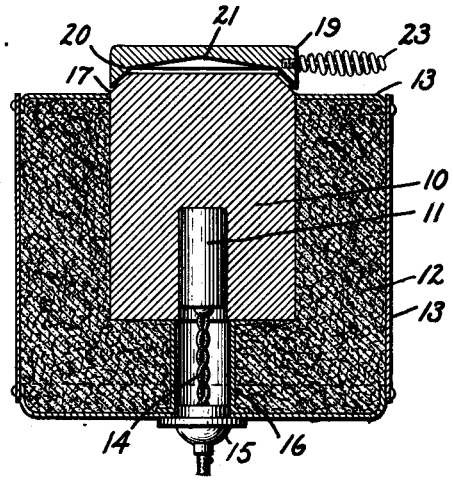
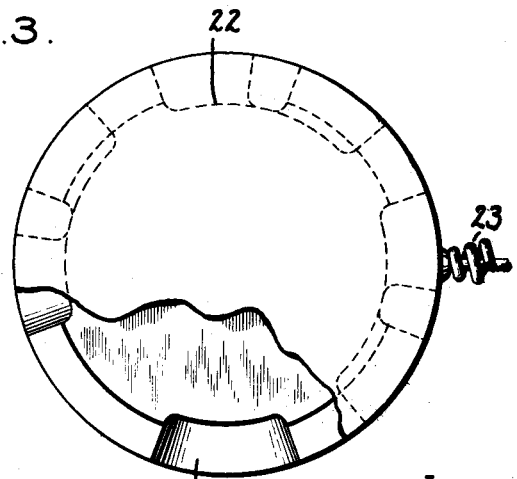
Witnesses:
Inventor:
John T. H. Dempster,
by Albert G. Davis
His Attorney

UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

ELECTRICAL HEAT-STORAGE DEVICE.

1,063,896.  Specification of Letters Patent.  Patented May 27, 1913.

Application filed October 7, 1912. Serial No. 724,243.

*To all whom it may concern:*

Be it known that I, JOHN T. H. DEMPSTER, a citizen of the United States, residing at Schenectady, county of Schenectady, State of New York, have invented certain new and useful Improvements in Electrical Heat-Storage Devices, of which the following is a specification.

My invention relates to electrical heat storage devices of the general character disclosed in Stanley Patent No. 1,025,843. Such devices comprise means for storing heat electrically at a comparatively low rate and for an extended period of time and means for transferring heat thus stored at a comparatively rapid rate for cooking and similar operations.

My invention relates more particularly to the means for rapidly transferring the stored heat.

One of the objects of my invention is to provide a device of this character by means of which the rate of heat flow from the storage mass may be conveniently regulated.

According to my invention I provide a heat transferring means or "thermal switch" comprising a body having high heat conductivity which preferably is adapted to be placed in contact with the storage mass or to be removed therefrom at will. I so construct the said thermal switch and that portion of the heat storage mass against which the said switch is adapted to be placed that certain portions of the contiguous surfaces thereof will be in contact and others will be separated by an insulating medium. I prefer to utilize the dead air inclosed by depressions in said contiguous surfaces as the insulating medium as it is well known that dead or confined air is a good heat insulator. In addition to the aforesaid construction I provide means for varying the extent of the area of contact between the thermal switch and storage mass and for varying at the same time the area of separation thereof. This variation is preferably secured by having either the storage mass or thermal switch movable with respect to the other. When the contact area is at a maximum and the separation area at a minimum the rate of heat flow will be at a maximum and vice versa.

My invention will be more clearly understood by referring to the accompanying drawing in which—

Figure 1 is a vertical section of a storage stove equipped with my invention; Fig. 2 is a vertical section of the cover which may be used in connection with the aforesaid stove and Fig. 3 is an enlarged plan view partly broken away showing the thermal switch, and a portion of the storage mass.

In the aforesaid drawing 10 is a storage mass which may be of iron or other material having high heat storage capacity and high thermal conductivity. The said heat storage mass is heated by means of the electrical resistance unit 11. The heat storage mass is surrounded by heat insulation 12 and the casing 13 which is preferably of metal. The conductors 14 of the electrical heating unit are connected to an external circuit by means of a plug 15 and extend to the unit 11 through the bushing 16. The heat storage mass 10 projects a short distance above the top of the casing 13. This portion of the heat storage mass is preferably frusto-conical in shape. The curved surface 17 thereof is provided with a series of grooves or depressions 18 as shown in Fig. 3. The thermal switch or heat conducting plate 19 is composed of iron or other material having high heat conductivity. The upper surface of the said plate is preferably flat although it may be of any desired shape so as to make good thermal contact with cooking receptacles and other bodies which it is desired to heat. The bottom surface of said plate is concave and the rim portion 20 thereof is of such shape as to fit closely with the surface 17 of the heat storage mass. The central portion 21 of the bottom surface is preferably concave so as to form a considerable space between the said plate and the storage mass when the plate is placed in position thereon. The rim portion 20 of the plate is provided with grooves or depressions 22 as is shown in dotted lines in Fig. 3. The said grooves or depressions are of the same size as the grooves 18 in the heat storage mass and are spaced apart the same distance as said grooves 18. The plate 19 is provided with a suitable handle 23.

The stove is provided with a cover 24 which is preferably a metal shell 25 filled with insulation 26. The bottom surface of the said cover is recessed at 27 so that it may fit tightly over the top of the heat storage mass when the cover is placed in position. The cover is also provided with handle 28.

In the operation of the above described stove the heat is stored electrically in the heat storage mass at such rate as desired. When it is desired to utilize the stove for cooking or other similar operation the cover 24 may be removed and the thermal switch placed in position upon the top of the heat storage mass. The rate of flow from the heat storage mass to a body which is placed upon the thermal switch may be regulated by turning the thermal switch upon its support. When the grooves or depressions 22 on the thermal switch coincide with the grooves or depressions 18 in the storage mass the contact area and also the rate of heat flow will be at a maximum. When the solid portions of the plate register with the grooves in the heat storage mass the separation area will be at a maximum and rate of heat flow will be at a minimum. Intermediate rates of heat flow may be secured by causing the thermal switch to assume intermediate positions.

Various modifications of the structure above described will readily occur to those skilled in the art and are to be considered as coming within the scope of my invention which is set forth in the following claims.

What I claim as new and desire to secure by Letters Patent of the United States, is:—

1. The combination in an electrical heat storage device of a heat storage mass, a heat conducting body mounted adjacent thereto, the contiguous surfaces of said elements each comprising portions adapted to contact with those of the other element and insulating portions, and means for varying the relative areas of contact and insulation between said elements.

2. The combination in an electrical heat storage device of a heat storage mass a part of which is surrounded by heat insulation and a heat conducting body mounted upon another part thereof, the contiguous surfaces of said elements each comprising portions adapted to contact with those of the other element and insulating portions, and one of said elements being movable to vary the relative areas of contact and insulation between the same.

3. The combination in an electrical heat storage device of a heat storage mass, a heat conducting body mounted adjacent thereto, the contiguous surfaces of said elements each having depressions therein and intervening portions adapted to contact with corresponding portions of the other element, one of said elements being movable to vary the relative areas of contact and separation of said elements.

4. In a heat storage device, a heat storage mass and a body for conducting heat therefrom, said elements having surfaces adapted to register and each provided with a series of similarly spaced depressions, the said elements being so disposed that one of said surfaces is movable upon the other.

5. The combination in an electrical heat storage device of a heat storage mass and a thermal switch rotatably mounted thereon the contiguous surfaces of said mass and said switch being similarly grooved so as to form contact and separation areas between the same.

In witness whereof, I have hereunto set my hand this 4th day of October, 1912.

JOHN T. H. DEMPSTER.

Witnesses:
 BENJAMIN B. HULL,
 HELEN ORFORD.

---

Copies of this patent may be obtained for five cents each, by addressing the "Commissioner of Patents, Washington, D. C."